Figure 3:
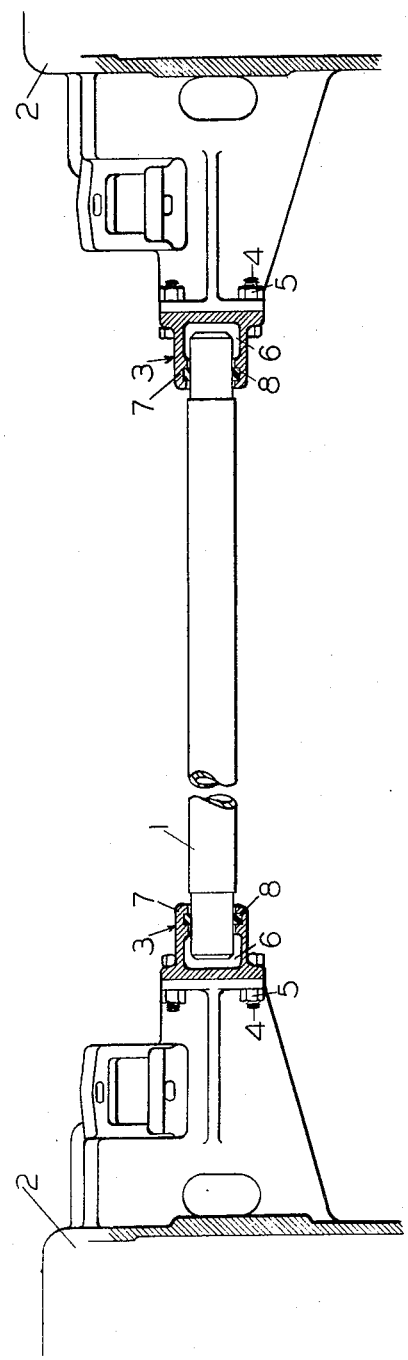

May 22, 1951 A. J. BENT 2,553,805
APPARATUS FOR CONDITIONING LOAD COMPENSATING BRAKES
Filed Nov. 19, 1947 2 Sheets-Sheet 1
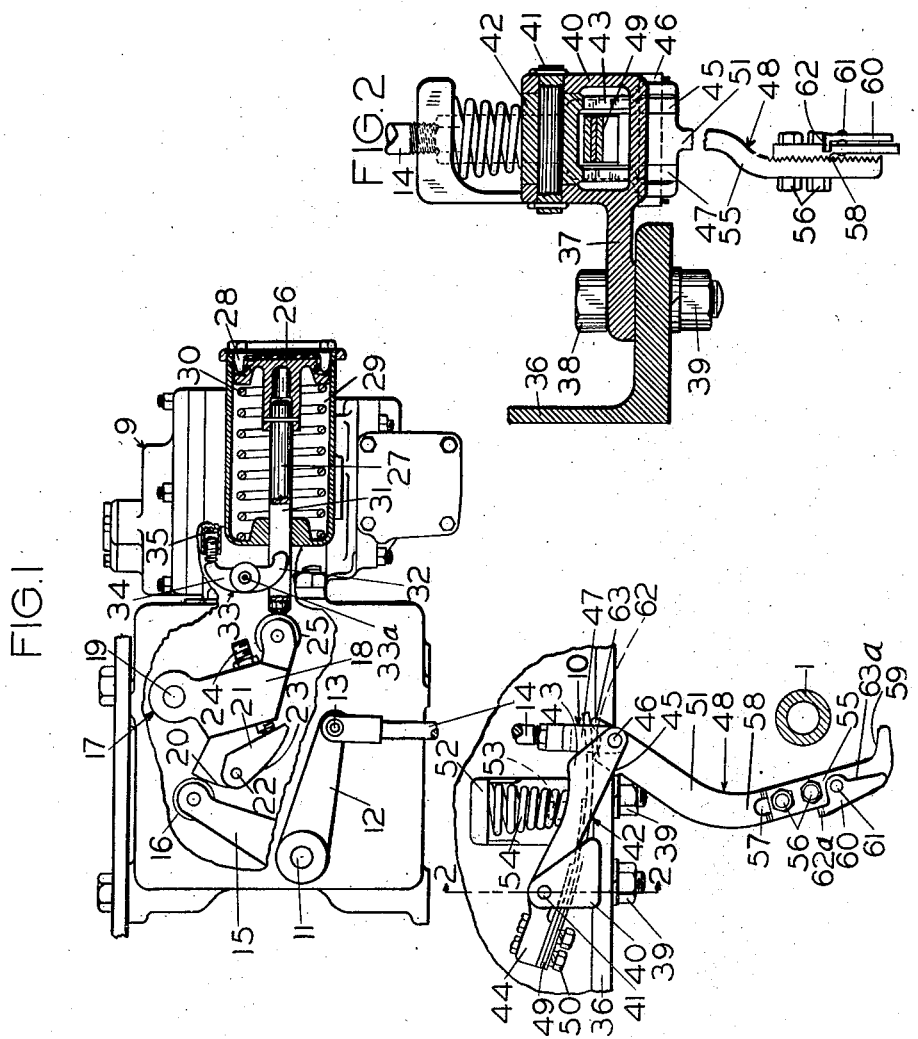
INVENTOR.
ARTHUR J. BENT
BY
Frank E. Miller,
ATTORNEY May 22, 1951 A. J. BENT 2,553,805
APPARATUS FOR CONDITIONING LOAD COMPENSATING BRAKES
Filed Nov. 19, 1947 2 Sheets-Sheet 2

INVENTOR.
ARTHUR J. BENT
BY
Frank E. Miller.
ATTORNEY

Patented May 22, 1951

2,553,805

UNITED STATES PATENT OFFICE 2,553,805

APPARATUS FOR CONDITIONING LOAD COMPENSATING BRAKES

Arthur J. Bent, Pittsburgh, Pa., assignor to The Westinghouse Air Brake Company, Wilmerding, Pa., a corporation of Pennsylvania Application November 19, 1947, Serial No. 787,014

30 Claims. (Cl. 303—22)

1

This invention relates to apparatus for conditioning load compensating brake equipment for railway vehicles and more particularly to that portion thereof which measures the variable vertical distance between a sprung portion and an unsprung portion of the vehicle and conditions the brake apparatus for operation to vary the degree of brake application according to variations in the weight of the load carried by the vehicle.

An object of this invention is to provide a novel apparatus mounted wholly on a sprung portion of a vehicle for accurately measuring or determining the change in vertical distance between a sprung portion and an unsprung portion, as determined by the load on the vehicle, and to adjust a variable load brake mechanism accordingly.

Another object of the invention is to provide an apparatus of the above type comprising only a few simple parts which are arranged in such a manner that a continuous measuring connection with the vehicle truck is not maintained but which are retracted out of interference with the truck after its load measuring and adjusting operation has been performed.

Another object is to provide an apparatus of the above type which is capable of being mounted on a wide variety of modern railway vehicles, where the clearance between the vehicle body and the truck is very limited, with little or no modification of the vehicle body or truck being necessary.

Another object is to provide a load compensating brake apparatus including a stop member with which said apparatus is cooperative for adjustment according to load and which stop member although mounted to two separate, vertically stationary unsprung members of a truck, will permit a small degree of movement of one stationary member relative to the other.

A further object is to provide an apparatus of the above mentioned type which is free from wear caused by vibration originating in the truck.

Other objects and advantages will appear in the following more detailed description of the invention.

The objects set forth above are attained by the use of an apparatus which is mounted entirely on the vehicle body, preferably on the center sill, and which is constructed and arranged in such a manner as to cooperate through novel linkage with the bottom of a transversely extending horizontal member, substantially midway of its length, which is rigidly secured to unsprung

2 parts of the vehicle truck so as to condition the brake equipment according to the position the vehicle body assumes vertically with relation to the vertically fixed or unsprung part of the truck.

In the accompanying drawing: Fig. 1 is a side elevational view of a measuring apparatus embodying part of the invention shown associated with a load compensating brake mechanism, Fig. 2 is an enlarged end elevational view of a portion of the same, partly in vertical section, taken on the line 2—2 of Fig. 1, and Fig. 3 is a side elevational view of a transverse stop member shown in vertical section in Fig. 1.

Description

In the drawings the measuring apparatus, constructed in accordance with the invention, is shown associated with a railway vehicle variable load or load compensating fluid pressure brake equipment of the type shown, described and claimed in Patent No. 2,482,246 issued to Earle S. Cook et al., on September 29, 1949, which measuring apparatus is wholly carried by the body of the vehicle.

The vehicle body may be of the passenger, freight or tender type and the trucks for carrying the same may each be of any desired construction and, since these parts are not essential to a clear understanding of the invention, they are not shown in the drawings. According to one feature of the invention a transverse stop member, such as that indicated by the reference character 1, and constituting an unsprung part of a vehicle truck and a part of the present invention, is resiliently mounted between unsprung side frames 2 of the truck in substantially parallel relation with the axles of the truck and with its longitudinal center disposed as closely as practicable to the pivotal axis of the truck. At each end of the transverse stop member 1 a support member 3 is mounted on each of the two side frames 2 by means of headed bolts 4 and nuts 5. Each of these support members 3 is provided at its inner face with an opening 6, into which one end of the stop member 1 extends, the opening having a slightly larger diameter than said end. Formed at the mouth of the opening 6 is an annular groove 7 which accommodates an annular bushing 8 formed of a resilient material such as rubber or the like, which bushing encircles one end of the stop member 1. In this manner the bushing 8 effects a flexible connection between the stop member 1 and support members 3 so as to permit slight angling (to the extent of 5 degrees for example) of the side frames 2 relative to the stop member in all directions, which arises from the shifting of one side frame relative to the other.

As shown in Fig. 1 of the drawings, a load compensating valve device 9 of the type shown and described in the aforementioned application is provided for conditioning by means including a load measuring apparatus or mechanism 10, for regulating the braking of the vehicle according to the load carried thereby, said means constituting a preferred embodiment of the invention.

The valve device 9 comprises a shaft 11 rockably journaled in the casing of said valve device for imparting movement to the measuring apparatus or mechanism 10 through the medium of a lever 12. One end of the lever 12 is rigidly secured to the exterior end of the shaft 11 while the other end of the lever is pivotally connected by means of a pin 13 to one end of a connecting rod 14 which makes operative connection with the measuring apparatus 10.

Rigidly secured at its one end to the interior end of the shaft 11 is a lever 15, which carries at its other end a rotatable roller 16 for operative engagement with a cam member 17, through which operating force, which is provided by means to be described later, may be transmitted to the connecting rod 14.

The cam member 17 comprises a carrier portion 18, which is pivotally depending on a pin 19 mounted in the casing of the valve device 9. The left-hand side of the carrier portion 18 as viewed in Fig. 1 is provided with a curved cam surface 20 which engages the roller 16 in such a maner that clockwise rotation of the cam member 17 will effect a counter-clockwise rotation of the lever 15. The cam member 17 further comprises an adjustable cam portion 21 rockably mounted by means of a pin 22 at the left-hand side of the carrier portion 18 so that a surface 23 thereof provides a continuation of the surface 20 for operative engagement with the roller 16. For reasons which will appear later the carrier portion 18 is further provided with a set-screw 24 by means of which the cam portion 21 may be adjusted relative to the carrier 18.

A roller follower 25 is rotatably mounted on the lower right-hand end of carrier portion 18, by means of which actuating force exerted by a piston 26 acting through the medium of its stem 27 is transmitted to the cam member 17. At one side of the piston 26 is a fluid pressure chamber 28 while at the other side is an atmospheric spring chamber 29 having a spring 30 operatively mounted therein between the piston and a section of the casing.

The piston stem 27 is provided with a slot 31 into which one arm 32 of a lever 33 extends, which lever is pivotally mounted in the casing by means of a pin 33a. An oppositely extending arm 34 of the lever 33 of the same length as the arm 32 operatively engages an end of a fulcrum actuator 35 so that movement of the piston 26 may be transmitted to the fulcrum actuator in a 1 to 1 ratio.

The measuring apparatus 10 may be mounted on any suitable sprung part 36 of the vehicle, such as a center sill of certain cars, or a draft sill of hopper cars. In the case of a hopper car the load compensating valve device 9, and hence the measuring apparatus 10, will probably be mounted at the end of the car and the transverse stop member 1 will be mounted at the outside or coupler end of the truck. On practically all other types of cars, however, the apparatus shown will be mounted at the inner end of the truck.

The measuring apparatus or mechanism 10 comprises a bracket 37 which is secured to the sill 36 by means of bolts 38 and cooperatively associated nuts 39. As shown in Fig. 2 a portion of the bracket 37 extends outwardly from the sill 36 a sufficient distance to permit operation of the apparatus 10 without interference of the sill and terminates at its outer end in an upwardly extending bifurcated support portion 40.

Journaled in the support portion 40 is a pivot pin 41 upon which a lever 42 is operatively mounted. The lever 42 comprises an arm 43 extending to the right of the pivot pin 41, as viewed in Fig. 1, and an arm 44 extending to the left of the pivot pin 41.

The arm 43 is formed in an approximately inverted U-shaped cross section and terminates at its right-hand end in a pair of ears 45 arranged in spaced relation to each other. For effecting the aforementioned operative connection between the valve device 9 and the measuring mechanism 10, a pin 46 is journaled in the ears 45 and makes a pivotal connection with the lower forked end 47 of the rod 14 which is disposed within the ears 45 with one end of a measuring leg 48 disposed within the forked end 47 of the rod 14.

The arm 44 constitutes an extension mounting for a multi-leaf spring 49, which spring aids in determining the position of the measuring leg 48 as will hereinafter appear. The outer end of the arm 44 is provided with screw-thread means 50 by which the multi-leaf spring 49 is rigidly secured at its one end to the lever 42. The spring 49 extends longitudinally through a portion of the space within the three walls of the lever 42 and through the forked end 47 of the rod 14 so that it bears down on the upper end of a portion 51 of the measuring leg 48 at each side of its pivotal connection on pin 46 so that the spring normally urges the leg to the position in which it is shown in Fig. 1 at one side of and out of contact with the stop member 1.

Interposed between and operatively engaging a spring seat 52, which as shown is integrally formed with the bracket 37, and a spring plug 53, which as shown is integrally formed on top of the arm 43 of the lever 42, is a spring 54 which tends to rotate the lever 42 in a clockwise direction about the pivot pin 41 toward its normal position in which it is shown in Fig. 1.

The measuring leg 48 comprises in addition to the portion 51, a contact foot 55 which may be brought into measuring engagement with the bottom of the transverse member 1 in a manner to be explained later. This contact foot 55 is adjustably but rigidly secured to the portion 51 by means of screw-thread means 56. By reason of a slot in portion 48 through which the screw-thread means 56 extends and complementary serrated faces of the portion 51 and foot 55, which faces are indicated at 58, the overall length of the measuring leg 48 may be varied as desired by adjusting the position of the foot 55 relative to the length of the portion 51 with the screw-thread means 56 loosened and then tightening said means in the desired position. The foot 55 is provided on its upper side with a straight line relatively narrow contact surface 59 which may be brought into contact with the bottom of the transverse stop member 1 in a manner explained more fully later.

For gaging the overall length to which the measuring leg 48 should be adjusted, a gage member 60 is rockably mounted by means of a pin 61 on the contact foot 55. Although this gage member 60 is used only when a major change in pick-up characteristics of vehicle body supporting springs is encountered, it is permanently attached to the foot 55 because it is not known when or where a major change, such as changing the trucks under a vehicle body, may take place.

*Operation*

In operation, let it be initially assumed that the brake equipment is devoid of fluid under pressure and that the vehicle is empty and the various parts of the brake equipment are in the positions in which they are shown in the drawings. When it is desired to condition the brake equipment for operation, the equipment is charged with fluid under pressure from a brake pipe (not shown) in the usual manner. As an incident to the initial charging of the equipment fluid under pressure is also supplied to chamber 28 in the load compensating valve device 9.

When the pressure of fluid in chamber 28 acting on the adjusting piston 26 is increased to a degree sufficient to overcome the opposing force of spring 30, said piston will move against said spring and thereby act through the medium of the piston stem 27, roller follower 25 and carrier portion 18 to rock the cam member 17 in a clockwise direction about the pin 19 to cause the lever 15, and thereby the shaft 11 and lever 12 rigidly attached thereto, to rock in a counter-clockwise direction, which rocking movement causes rod 14 to be moved in an upward direction.

Since the rod 14 is pivotally connected to the lever 42 by means of the pivotal pin 46, upward movement of the rod causes the lever 42 to rock in a counter-clockwise direction about the pivot pin 41, carrying with it the measuring leg 48 in an arc of a circle about the pin 41. Initial movement of the lever 42 about the pin 41 brings the right-hand side of the leg 48, as viewed in Fig. 1, into engagement with the left-hand side of the transverse member 1.

By reason of the above mentioned lateral engagement between the leg 48 and the stop member 1, continued rocking of the lever 42 in a counter-clockwise direction imparts an upward movement to the leg 48 relative to the member 1 and causes the leg to rock in a clockwise direction about the pivot pin 46 at the upper end of the leg against the force of the leaf spring 49 which maintains said leg is contact with said stop member. This movement of the leg 48 in a clockwise direction about the pin 46 causes a surface 62 at the upper left-hand corner of the portion 51, as viewed in Fig. 1, to move in an upward direction, flexing the right-hand end of spring 49 upwardly out of its normal position in which it is shown in Fig. 1.

The leg 48 continues to move upward under the operation of the load compensating valve device 9 in the manner just described until brought to a stop by the engagement of the contact surface 59 of the contact foot 55 with the bottom surface of the transverse member 1.

As previously noted the position in a vertical direction of the sill 36 relative to the transverse stop member 1 as shown in Fig. 1 is that which is assumed when the vehicle is empty, and with the several parts of the load compensating valve device 9 and load measuring apparatus 10 disposed relative to each other as illustrated in Fig. 1, the contact surface 59 will be substantially parallel with the bottom of the sill 36 when the foot 55 is in engagement with the stop member 1. Further with the vehicle empty, as under consideration, the roller 16 will be disposed at the junction of cam 20 and cam 21 at the time the foot 55 engages stop 1, and the opposite ends of lever 33 will be in contact with, respectively, the right hand end wall of slot 31 in the adjusting piston stem 27 and the end of the fulcrum actuator 35, which actuator will be in its extreme left-hand or empty position, as shown in the drawing, on account of its being constantly urged in the direction of said position during an adjusting operation by a biasing force as described in the aforementioned application.

In accordance with the invention disclosed in the aforementioned patent application the point at which the measuring mechanism 10 and consequently the shaft 11 of the valve device 9 ceases to move determines the degree of braking which the load compensating valve device 9 effects. When a load is placed on the vehicle, the increased weight causes the truck springs (not shown) to be further compressed, resulting in the car body and the sill 36 moving downward relative to the stop member 1. With the vertical distance between the sill 36 and the stop member 1 thus reduced and the distance between the contact foot 55 and the stop member 1 increased, the lever 12 and shaft 11 are permitted to rotate further under the action of cam 21 and piston 26 before the foot 55 and the stop member 1 engage. This further movement is proportional to the degree of load on the vehicle, and through the medium of lever 33, the movement of piston 26 shifts the fulcrum actuator 35 a proportional distance from empty position for conditioning the valve device 9 to effect additional braking force which is proportionally greater as the degree of movement and vehicle load increases. Under load conditions also the surface 59 of the foot 55 is substantially parallel with the bottom of the center sill 36.

Since the stop member 1 is located close to the pivotal axis of the truck and is engaged near the middle transversely of its bottom surface by the relatively narrow contact surface 59 extending in a line perpendicular to the vertical center line of the member 1 when the vehicle is on a straight piece of track, it will be readily apparent that angular movement of the truck relative to the car body, either in a vertical or horizontal plane will not seriously affect the measuring accuracy.

During an adjustment operation such as above described the distance that the measuring leg 48 travels in an upwardly direction before engaging the transverse stop member 1 is determined by an adjustment made by the use of the gage member 60 when, with a vehicle empty, the brake equipment is being installed or when a change critical to the operation of the equipment occurs such as due to change in pick-up characteristics of the car body supporting springs or changing a truck.

To effect such adjustment the screw-thread means 58 is loosened and lowered to the bottom of the slot 57 thereby lowering the contact foot 55 relative to the leg portion 51.

The gage member 60 is then rotated counter-clockwise about the pin 61 from the position in which it is shown in the drawings in which an inwardly extending lug 62a abuts the left-hand side of the foot 55 as viewed in Fig. 1, to a position defined by said lug again engaging the left-hand side of the foot. In the position thus defined, an upper surface 63a of the member 60 is disposed substantially parallel to the straight line surface 59 on the foot 55. The leg 48 as a unit is now rotated manually from the position in which it is shown in the drawings in a counter-clockwise direction about the pin 46 and against the pressure of the leaf spring 49 now acting on an upper right-hand corner 63 only of the portion 51, until the right-hand side of the leg 48, as viewed in Fig. 1, engages the left-hand side of the transverse stop member 1. While holding the leg 48 in this position the screw-thread means 56 is moved upwardly in the slot 57, carrying with it the gage member 60, until the surface 63a thereof, now parallel to surface 59, engages the bottom surface of the stop member 1. The screw-thread means 56 is then tightened into locking engagement with the serrated portion 58. The measuring leg 48 is now adjusted on the specific empty vehicle to the proper length for operation to condition the brake equipment for braking said vehicle according to the empty or loaded condition thereof. When released from the operator's hand, the leg 48 returns under the influence of the spring 49 to the position in which it is shown in Fig. 1 and the gage member 60 returns by gravity to the position in which it also is shown.

It has been noted that the spring 49 resists rotation of the leg 48 about the pin 31 in either direction from that in which it is shown. However, the resistance to clockwise rotation is exerted over a limited zone so that the leg may be rocked to a position in which it will not interfere with repair work on the truck.

It will be apparent that when it is desired to remove the truck of the car away from the car body that the leg 48 might interfere with the operation, since it normally extends downwardly below the level of the axles and, as previously pointed out, either between the axles or at the outer side of the truck. Consequently, means have been provided by the use of the leaf spring 49 and the corner surface 62 in such a cooperative relation that the leg 48 may be rotated clockwise about the pin 46 against the force of the spring 49 to a point where the surface 62 is on the right-hand side of the pin 46 as viewed in Fig. 1, after which the spring will exert a force on the leg in a direction for clockwise rotation. This last mentioned force is sufficient to maintain the leg 48 out of interference with the aforesaid detrucking operation.

Experimentation and tests have shown that due to inherent characteristics found in relay valve devices of the scale beam lever type, such for example as disclosed in the copending application of Earle S. Cook, Serial No. 658,030, filed March 29, 1946, now U. S. Patent Number 2,501,713, and assigned to the assignee of the present application, shifting of the beam fulcrum from "empty" position to "load" position in equal amounts in response to displacement of a measuring leg, such as 48, in equal amounts as a result of increases in load does not produce changes in the braking power on the vehicle in equal amounts. In other words, the increase in braking power produced by such a relay valve device, as a result of an increase in load, does not bear a straight line relationship to the displacement of a measuring leg in a downward direction but the relationship is best delineated by a curved line showing its greatest deviation from a straight line near the middle of its length, or in other words, such a relay valve device will not vary the braking power on a vehicle in direct proportion to variations in the load on a vehicle.

Since the aforementioned straight line relationship is considered desirable in order to obtain accurate and uniform variations in braking power in accordance with variations in the weight of the lading on the vehicle, the cam portion 21 is provided in the linkage between the measuring leg 48 and the actuating piston 26 together with the actuator 35. As will be noted, this cam portion 21 is provided with a bearing surface 23 which is curved so that as the surface 23 moves over the roller 16 it varies the movement of the actuator 35 relative to the movement of the measuring leg 48 in such manner as to compensate for the deviation found to be inherent in scale beam lever type relay valve devices such as disclosed in the Cook application, Serial No. 658,030, now U. S. Patent Number 2,501,713.

On different cars the deflection of the body supporting springs vary, as for example, on one car the deflection of the springs between the empty and full-loaded conditions of the car may be only three quarters of an inch, while on other cars it may be as great as two inches. The cam portion 21 is adjustable by screw 24 in accordance with the deflection characteristics of different car supporting springs to provide for greater or less movement of the measuring leg 48, as required to properly position the fulcrum actuator 35 in accordance with the particular car to which the equipment is applied. For instance, assuming that cam portion 21, as shown in the drawing is adjusted for a car spring deflection of three quarters of an inch, and that the equipment is applied to a car on which the deflection of the body supporting springs is two inches, the cam portion 21 will be adjusted outwardly in a clockwise direction to a position for increasing the movement of the measuring leg 21 with respect to the movement of the adjusting piston 26 to a degree which will provide the same positioning of the fulcrum actuator 35 with respect to a fulcrum beam (not shown) for the fully loaded car as would be obtained on a car having a less spring deflection. It will thus be seen that regardless of the different deflection characteristics of the body supporting springs on different cars to which the equipment is applied, the adjustment of the cam portion 21 provides for obtaining the same positioning of actuator 35 for different degrees of load on the different cars.

As above described the measuring apparatus is operative to condition the valve device 9 according to the loaded condition of the car during charging of the brake pipe. It is desired to point out however, that such conditioning occurs during the initial portion of the charging operation, following which locking means becomes effective to hold the actuator 35 in its adjusted position and fluid under pressure is released from piston chamber 28 as fully described in the first named Cook application. Upon this release of fluid under pressure from piston chamber 28, spring 29 returns the piston 26 to its normal position which permits spring 54 to move the leg 48 and, through the medium of rod 14, levers 12, 15 and roller 16, return the cam element 17 to their normal position in which they also are shown in the drawing This is the condition these parts will remain in during subsequent operation of the brakes.

Summary

It will thus be seen that there has been provided by this invention an apparatus for conditioning load compensating brakes which is simple in construction and accurate in operation and which embodies a lever or measuring leg placed on a sill of a vehicle body in a position close to the pivotal axis of a truck of the vehicle, where it may be swung into cooperative relation with a fixed and unsprung horizontal part of the truck near its pivotal axis for accurately conditioning the brake apparatus according to the load on the vehicle regardless of the angular position of the truck. This leg is then withdrawn from operative connection with the unsprung part of the truck for normal operation of the brakes. The apparatus carries a fixed gage means permanently attached thereto which permits conditioning of the load compensating brake to suit body supporting springs having different degrees of compression or pick-up between empty and full load conditions of a vehicle. When it is desired to change the truck with which the conditioning apparatus is associated, the measuring leg of the apparatus may be placed in a position of noninterference with the detrucking operation.

The measuring leg is operatively associated with a load compensating valve device by means of a linkage which includes a cam having such an engaging surface as will produce a straight line relationship between the degree of movement of the leg and the change in braking power according to load, a relationship which does not exist when a relay valve device of the ordinary type employing a scale beam lever and a shiftable fulcrum is used.

The above mentioned cam is also made adjustable so that the distance the measuring leg travels to shift the fulcrum from empty position to load position may be varied according to the amount of deflection of different truck springs from empty to full load conditions of a vehicle.

It will thus be seen that a linkage is provided in a load compensating brake apparatus which permits varied positioning of the measuring leg by means of the gage member and various ranges of movement by adjustment of the cam to suit different service conditions.

Having now described the invention, what I claim as new and desire to secure by Letters Patent, is:

1. An apparatus for conditioning a load compensating brake equipment of a vehicle according to the degree of vertical displacement of a sprung part relative to an unsprung part in response to variations in the weight of the load on said sprung part, said unsprung part being capable of angular movement relative to said sprung part, said apparatus comprising in combination, a stop member rigidly mounted on said unsprung part, an arm rockably mounted at one end on said sprung part, a leg rockably mounted on the other end of said arm, resilient means normally holding said leg in a certain spread position relative to said arm, resilient means urging said measuring mechanism toward a normal position out of engagement with said stop member, and means for actuating said measuring mechanism as a unit into lateral engagement with said stop member and thereafter rocking said leg relative to said arm until said leg is stopped by engagement with said stop member.

2. An apparatus for conditioning a load compensating brake equipment of a vehicle of the type having an unsprung truck part and a sprung body part movable vertically relative to the unsprung part in response to the variations in weight imposed thereon and said unsprung part being capable of angular movement relative to said sprung part, said apparatus comprising in combination, a member mounted on said unsprung part adjacent the pivotal axis of said truck, a measuring leg mounted on said sprung part for movement in a longitudinal plane of said vehicle adjacent the middle of said transverse member, mounting means rockably mounted on said body for normally supporting said measuring leg in spaced relation to said stop member, resilient means for normally retaining said measuring leg in a certain spread relation to said mounting means, and means for actuating said mounting means and said leg together until said leg engages a lateral surface of said stop member and for then moving said leg vertically until the leg engages said stop member at a point in a vertical plane through its longitudinal center line.

3. Apparatus for conditioning a load compensating brake equipment for a vehicle having a sprung body part and an unsprung truck part which is capable of angular movement relative to the sprung part, said apparatus comprising in combination with said sprung and unsprung parts measuring mechanism wholly carried by said sprung body part and comprising a rockable leg, means rockably supporting said leg in depending relation to said sprung part at one side of said sprung part, and a foot on said leg turned toward said unsprung part, said leg being rockable into engagement with said side of the unsprung truck part and slidable thereon until said foot engages the unsprung part at a point in the vertical center plane through said unsprung part regardless of the angular position of the unsprung truck part with relation to said sprung body part for conditioning the brake equipment for operation to provide the braking called for by the load, and means for actuating said leg to engage said unsprung truck part.

4. Conditioning apparatus for a brake mechanism for a vehicle having a spring supported portion and an unsprung truck part, said apparatus comprising in combination, a member adjustable for varying the vehicle braking force, a stop mounted on said unsprung part adjacent the pivotal axis of the truck, means mounted on said spring supported portion adjacent said horizontal stop for measuring the vertical distance between said unsprung part and said spring supported portion and for adjusting said member accordingly, said means comprising a normally depending measuring leg disposed at one side of said stop and having a cornered end and operable into vertical alignment with said horizontal stop, and an arm rockably mounted on said spring supported portion and having a pivotal supporting connection with said leg between the corners of its said cornered end and resilient means carried by the supporting arm and operatively engaging said corners to normally maintain said measuring leg in a certain spread position relative to said arm and to oppose rotation of said leg relative to said arm.

5. Conditioning apparatus for a brake control mechanism for a vehicle having a truck including springs upon which a vehicle body is supported, said apparatus comprising in combination, a member adjustable for varying the vehicle braking force according to the position to which said member is adjusted, a stop member rigidly mounted on a vertically stationary part of said truck adjacent the pivotal axis of the truck, a measuring mechanism comprising a leg having at its free end a toe turned in the direction of said stop member, and a support member pivotally mounted at one end to said body and at its other end rockably supporting said leg, resilient means for normally holding said leg and said support member in a certain spread relation to each other and resistant to rocking of said leg on said member, a second resilient means for urging said mechanism out of engagement with said stop member, and means acting through the medium of the adjustable member for rocking said leg about its one end for thereby actuating said leg into lateral engagement with said stop member and then moving said leg vertically until said toe engages said stop member at a point substantially in the middle of the longitudinal center line of said stop member.

6. In combination with a vehicle brake control mechanism having a member adjustable for varying the vehicle braking force according to the position to which said member is adjusted, a stop mounted on a vertically fixed part of a truck of the vehicle adjacent the pivotal axis of said truck, an arm rockably mounted on a spring supported portion of the vehicle adjacent said stop, a measuring leg pivotally mounted on said arm having its pivotal end cornered and a toe at its other end having a plain surface movable into engagement with said stop at a point in a vertical line of adjustment for measuring a change in the vertical distance between said fixed part and said spring supported portion and effecting the adjustment of said member accordingly, means for actuating the plain surface of the toe into operative engagement with said stop, resilient means carried by said arm operatively engaging the cornered end of said leg so as to normally maintain said leg in a certain spread position relative to said arm, said resilient means permitting manual rocking movement of said leg on said arm into lateral engagement with said stop, gaging means carried by said leg having a surface movable into spaced parallel relation with said plain surface of said toe, and means for adjusting said toe in an approximately vertical direction so that said gaging means may engage said stop when the leg is in lateral engagement with said stop, thereby predetermining the vertical travel of said toe and said leg for adjusting said member for a certain degree of braking.

7. The combination with a sprung part and an unsprung part of a vehicle, said sprung part being movable vertically relative to said unsprung part distances varying according to different loads carried by the sprung part, and a fluid pressure brake equipment conditionable according to the distance the sprung part moves relative to the unsprung part for operation to provide the braking power called for by the load carried, of a mechanism carried by said sprung part and comprising a member adjustable for conditioning the fluid pressure brake equipment, a measuring mechanism carried by said sprung part and including a measuring element having a contact surface movable relative to said sprung part into engagement with said unsprung part for ascertaining the degree of vertical movement of said sprung part relative to said unsprung part, a gage member mounted on said element and operable manually into vertically spaced relation with said contact surface of said element, and means for manually adjusting said gage member into contact with said unsprung part for determining the vertical distance between said element and said unsprung part for certain conditions of braking.

8. A measuring mechanism for a load compensating brake equipment for a railway vehicle having an unsprung part and a load carrying sprung part, comprising an arm rockably mounted at one end on said sprung part, a leg disposed at one side of said unsprung part and rockably mounted at one end on the opposite end of said arm and comprising a foot at its opposite end for engaging an undersurface of said unsprung part, resilient means normally holding said leg in a chosen spread relation to said arm, and means for rocking said arm in a direction to move said leg laterally for contact with a side of said unsprung part and then vertically for moving said foot into contact with said unsprung part.

9. A measuring mechanism for a load compensating brake equipment for a railway vehicle having an unsprung part and a load carrying sprung part, comprising in combination with said sprung and unsprung parts, an arm rockably mounted at one end on said sprung part, a vertically disposed swinging leg pivotally connected at its upper end to the opposite end of said arm and depending therefrom at one side of said unsprung part, said leg comprising a foot at its opposite end for engaging an undersurface of said unsprung part, said leg comprising two parts, one connected to said arm and the other carrying said foot and adjustable relative to each other in the direction of the length of the leg, and means for securing said two parts together.

10. A measuring mechanism for a load compensating brake equipment for a railway vehicle having an unsprung part and a load carrying sprung part, comprising an arm rockably mounted at one end on said sprung part, a leg disposed at one side of said unsprung part and rockably mounted at one end on the opposite end of said arm and comprising a foot at its opposite end for engaging an undersurface of said unsprung part, said leg comprising two parts, one part connected to said arm and the other part carrying said foot and being adjustable relative to said one part in the direction of the length of said leg, a gage member carried by said other part movable manually to a gaging position for cooperation with the under-side of said unsprung part when said leg is in contact with the side of said unsprung part for defining a position of said foot spaced vertically from said underside of said unsprung part, and means for rigidly securing said two parts of said leg to each other.

11. A measuring mechanism for a load compensating brake equipment for a railway vehicle having an unsprung part and a load carrying sprung part, comprising an arm rockably mounted at one end on said sprung part, a bent leg depending from said arm and having a pivotal connection at its upper end with said arm near the opposite end thereof which pivotal connection is adapted to be disposed substantially over said unsprung part, said leg comprising at its opposite end an offset part for engaging the underside of said unsprung part, resilient means for normally holding said leg spaced from said unsprung part and for opposing movement of said leg relative to said arm, and means for actuating said arm to move said leg into engagement with the side of said unsprung part and for pulling said offset part vertically into contact with the under-side of said unsprung part.

12. A measuring mechanism for a load compensating brake equipment for a railway vehicle having an unsprung part and a load carrying sprung part, comprising an arm rockably mounted at one end on said sprung part, a leg disposed at one side of said unsprung part and rockably mounted at one end on the opposite end of said arm and comprising a foot at its opposite end for engaging an under-surface of said unsprung part, resilient toggle means for normally holding said leg in a certain spread relation to said arm with said arm in a normal position and for opposing movement of said leg relative to said arm, said toggle means having an overcenter position for urging said leg toward said arm.

13. A measuring mechanism for a load compensating brake equipment for a railway vehicle having an unsprung part and a load carrying sprung part comprising an arm pivotally connected at one end to said sprung part, a leg depending from said arm and pivotally connected at its upper end to the opposite end of said arm and having at its lower end a foot for engaging an under-surface of said unsprung part, spring means carried by said arm acting on the upper end of said leg normally at both sides of its pivotal connection with said arm for holding said leg in a chosen spread relation to said arm and for opposing rocking movement of said leg relative to said arm, said arm having a normal position in which said leg is spaced away from said unsprung part and being operable to move said leg from said normal position for engagement with the side of the unsprung part and then vertically to move said foot into contact with the under-side of said unsprung part, and means for operating said arm.

14. A measuring mechanism for a load compensating brake equipment for a railway vehicle having an unsprung part and a load carrying sprung part, comprising an arm pivotally connected at one end to said sprung part, a leg depending from said arm and pivotally connected at its upper end to the opposite end of said arm and having at its lower end a foot for engaging an under-surface of said unsprung part, a leaf spring secured at one end to said arm and at the other end exerting a force on the upper end of said leg at both sides of its pivotal connection with said arm for holding said leg in a chosen spread relation to said arm and for opposing rocking movement of said leg relative to said arm, said arm having a normal position in which said leg is spaced away from said unsprung part, and means for turning said arm and thereby said leg for moving said leg into engagement with the side of the unsprung part and for then moving said foot vertically into contact with said unsprung part.

15. A measuring mechanism for a load compensating brake equipment for a railway vehicle having an unsprung part and a load carrying sprung part comprising an arm pivotally connected at one end to said sprung part, a leg depending from said arm and pivotally connected at its upper end to the opposite end of said arm and having at its lower end a foot for engaging an under-surface of said unsprung part, a leaf spring secured at one end to said arm and at the other end exerting a force on the upper end of said leg at both sides of its pivotal connection with said arm for holding said leg in a chosen spread relation to said arm and for opposing rocking movement of said leg relative to said arm, said arm having a normal position in which said leg is spaced away from said unsprung part, resilient means carried by said sprung part acting on said arm for holding said arm in said normal position, and means for operating said arm against the force of said resilient means to move said leg for engagement with the side of said unsprung part and then vertically, for causing the leg to rock upon said arm against the force of said spring means, into contact with the under-side of said unsprung part.

16. A measuring mechanism for a load compensating brake equipment for a railway vehicle having an unsprung part and a load carrying sprung part, comprising a bracket mounted on said part and having an offset portion, an arm pivotally connected at one end to said bracket, a leg depending from said arm by means of a pivotal connection at its upper end to the other end of said arm and having at its lower end a foot for engaging the under-side of said unsprung part, spring means carried by said arm normally acting on the upper end of said leg at both sides of its pivotal connection with said arm for holding said leg in a chosen spread relation to said arm and for opposing rocking movement of said leg relative to said arm, said arm having a normal position in which said leg is spaced away from said unsprung part, a spring interposed between said offset portion of said bracket and said arm urging said arm to its normal position, and means for operating said arm out of its normal position against the force of said spring for moving said leg into engagement with the side of said unsprung part and then vertically also into contact with the under-side of said unsprung part.

17. A measuring mechanism for a load compensating brake equipment for a railway vehicle having an unsprung part and a load carrying sprung part, comprising an arm rockably mounted at one end on said sprung part, a leg disposed at one side of said unsprung part and rockably mounted at one end on the opposite end of said arm for engagement with a side of said unsprung part and comprising at its opposite end a foot having a straight surface for engaging an under-surface of said unsprung part, said leg comprising two parts, one part connected to said arm and the other part carrying said foot and being adjustable relative to said one part in the direction of the length of said leg, a gage member pivotally mounted on said other part of said leg and movable manually relative to said leg to a gaging position in which a surface thereof is arranged above, parallel to and spaced away from the straight surface on said foot for defining said gaging position, and the gage member being movable by gravity out of said gaging position, and means for rigidly securing said two parts of said leg to each other.

18. Means for cooperation with measuring apparatus of a load compensating brake equipment for conditioning said equipment according to the load on a vehicle of the type having a transverse unsprung truck part and a sprung body part movable vertically relative to the unsprung part in response to variations in said load and said unsprung part being capable of angular movement relative to said sprung part, said means comprising a transverse stop member for mounting on said transverse unsprung truck part adjacent the pivotal axis of said truck, a pair of support members mounted in facing relation to each other on opposite sides of said unsprung part, each support member having an opening in its inner face of greater sectional area than that of said transverse stop member for receiving an end of the stop member, and a resilient bushing contained in each of said support members and surrounding an end of said stop member for effecting a yieldable connection between said stop member and the support member.

19. In a load compensating brake equipment for a railway vehicle having an unsprung part and a load carrying sprung part, the combination of, a member to be variously positioned for varying the vehicle braking force according to the position to which said member is moved, a stop mounted on said unsprung part, a measuring leg mounted on said sprung part, power means for actuating said leg into measuring engagement with the under surface of said stop to thereby determine the position of said member, a linkage operatively connecting said power means and said member to said measuring leg, means mounted on said leg for adjusting the length of said leg, and gaging means associated with said leg and operable manually to determine the measuring length of said leg when said member is in a certain position.

20. In a load compensating brake equipment for a railway vehicle having an unsprung part and a load carrying sprung part, the combination of a member having a no-load position for conditioning said equipment for braking an empty vehicle and movable therefrom in graduated degrees to a load position for conditioning said equipment for braking a loaded vehicle, a measuring leg mounted on said sprung part for operation into measuring engagement with a portion of said unsprung part for adjusting said member, gaging means associated with said leg operable manually to determine the no-load position of said member, power means for actuating said member together with said leg from no-load position to load position of said member, and a linkage operatively connecting said power means and said member to said measuring leg, said linkage comprising a cam means adjustable to effect movement of said leg from its gaged position to engagement with said portion as the member is moved from no-load to load position.

21. In a combination with a load compensating brake equipment for a railway vehicle having an unsprung part and a load carrying sprung part, said equipment comprising a member to be variously positioned for varying the vehicle braking force according to the position to which said member is moved between no load and full load positions thereof, a stop mounted on said unsprung part, a measuring leg mounted on said sprung part and operable in the direction of the length of the vehicle into measuring engagement with the under-surface of said stop to thereby determine the position of said member, a linkage connecting said leg to said member, means for adjusting the length of said leg, gaging means operable manually to determine the adjusted length of said leg for positioning said member in said no load position, and means interposed in said linkage adjustable to determine the total movement of said leg according to the no load and positions of said member.

22. In a load compensating brake equipment for a railway vehicle having an unsprung part and a load carrying sprung part, the combination of, a stop member mounted on said unsprung part, a measuring leg mounted on said sprung part and operable into engagement with said stop member for measuring the distance said sprung part has moved relative to the unsprung part due to a change in the weight of the load on the vehicle, a member adapted to be adjusted to vary the braking power on the vehicle in a relationship deviating from a direct proportion to the degree of movement of said member, power means for actuating said member and said leg in unison, and adjustable means in the operative connection between said leg and said power means and said member for limiting movement of said member by said power means to a degree to provide said relationship.

23. In a load compensating brake equipment for a railway vehicle having an unsprung part and a load carrying sprung part adjustable from an empty position vertically relative to said unsprung part in direct proportion to the degree of load applied to said sprung part, said equipment comprising brake control means adjustable for limiting the braking of the vehicle in direct proportion to the degree of load carried by said sprung part, a measuring element carried by said sprung part for engaging said unsprung part and having a certain initial free movement relative to said unsprung part and further movement directly proportional to the degree of load on the vehicle, a cam element comprising non-adjustable cam means for moving said measuring element through said certain movement, and adjustable cam means for moving said measuring element through said further movement, and power means for actuating said cam means and for adjusting said brake control means.

24. In a load compensating brake equipment for a railway vehicle having an unsprung part and a load carrying sprung part adjustable from an empty position vertically relative to said unsprung part in direct proportion to the degree of load applied to said sprung part, said equipment comprising brake control means adjustable for limiting the braking of the vehicle in direct proportion to the degree of load carried by said sprung part, a measuring element carried by said sprung part for engaging said unsprung part and having a certain initial free movement relative to said unsprung part and further movement directly proportional to the degree of load on the vehicle, a cam element comprising non-adjustable cam means for moving said measuring element through said certain movement and adjustable cam means for moving said measuring element through said further movement, power means for actuating said cam means, and lever means also operable by said power means for adjusting said brake control means.

25. In a load compensating brake equipment for a railway vehicle having an unsprung part and a load carrying sprung part adjustable from an empty position vertically relative to said unsprung part in direct proportion to the degree of load applied to said sprung part, said equipment comprising a brake control element having an empty position and adjustable therefrom in unequal increments of movement to provide equal increments of increase in braking of said vehicle, a measuring element carried by said sprung part for engaging said unsprung part and having a certain initial free movement relative to said unsprung part and further movement directly proportional to the degree of load on the vehicle, a cam element comprising non-adjustable cam means for moving said measuring element through said certain initial free movement and adjustable cam means for moving said measuring element through said further movement, a fluid pressure actuated piston for actuating said cam element, and means operable by said piston to adjust said brake element coincident with operation of said adjustable cam means.

26. Load adjusting mechanism for a load compensating fluid pressure brake equipment for use on a vehicle having a sprung part and an unsprung truck part, comprising in combination, load adjusting structure normally disposed at one side of said unsprung part for movement into load measuring relation therewith, and means providing for hand movement of said structure to a vertical position to clear said unsprung part and for releasably holding said structure in said position.

27. Load adjusting mechanism for a load compensating fluid pressure brake equipment for use on a vehicle having a sprung part and an unsprung truck part, comprising in combination, a substantially vertically disposed load adjusting leg normally disposed at one side of said unsprung part for pivotal movement from a normal position in one direction into load measuring engagement with said unsprung part and in the opposite direction to an elevated position for clearing said unsprung part, spring means acting on said leg at either side of its pivotal connection for opposing movement of said leg from its normal position and to act on said leg at only one side of said pivotal connection in said elevated position of said leg for holding said leg in said elevated position.

28. Means for cooperation with measuring apparatus of a load compensating brake equipment for conditioning said equipment according to the load on a vehicle of the type having transversely extending unsprung truck parts and a sprung body part movable vertically relative to the unsprung parts in response to variations in said load and said unsprung parts being capable of angular movement relative to said sprung part, said means comprising a transversely extending stop member interposed between said transversely extending truck parts in proximity to the pivotal axis of said truck, said unsprung truck parts comprising a pair of support members mounted in facing relation to each other on opposite ends of said transversely extending stop member, the face of each support member having an opening of greater sectional area than that of said transverse stop member for receiving an end of the stop member, and a resilient bushing contained in each of said support members and surrounding an end of said stop member for effecting a yieldable connection between said stop member and the respective support member.

29. In a variable load brake equipment of the type having a measuring apparatus for varying the degree of brake application according to variation in the vertical distance between a sprung part and an unsprung part of a vehicle in response to different degrees of load on said vehicle, said unsprung part being capable of angular movement relative to said sprung part, in combination, a pair of side frames, each having a transversely extending bracket with an opening at its inner end, a transversely extending stop member for cooperation with said measuring apparatus interposed between said brackets and having its ends extending into the respective openings in said brackets, and resilient means interposed between said ends of said stop member and said brackets.

30. In a variable load brake equipment of the type having a measuring apparatus for varying the degree of brake application according to variation in the vertical distance between a sprung part and an unsprung part of a vehicle in response to different degrees of load on said vehicle, said unsprung part being capable of angular movement relative to said sprung part, in combination, a pair of side frames having individual transversely and inwardly extending brackets, a transversely extending stop member interposed between and mounted in said brackets, and resilient means interposed between said stop member and one of said brackets.

ARTHUR J. BENT.

REFERENCES CITED

The following references are of record in the file of this patent:

UNITED STATES PATENTS

| Number | Name | Date |
|---|---|---|
| 1,742,843 | Benedict | Jan. 7, 1930 |
| 2,092,245 | Farmer | Sept. 7, 1937 |
| 2,110,703 | Farmer | Mar. 8, 1938 |
| 2,155,226 | Renshau | Apr. 18, 1939 |
| 2,402,434 | Nelson et al. | June 18, 1946 |